3,419,470
11-MICROBIOLOGICAL HYDROXYLATION OF STEROIDS IN PRESENCE OF DIMETHYLSULFOXIDE
Alejandro Zaffaroni, Atherton, Calif., and Carlos Casas Campillo, Mexico City, Mexico, assignors to Syntex Corporation, Panama, Panama, a corporation of Panama
No Drawing. Filed Mar. 14, 1966, Ser. No. 533,872
Claims priority, application Great Britain, Mar. 15, 1965, 10,791
12 Claims. (Cl. 195—51)

The present invention relates to microbial transformations of steroids.

More particularly, the present invention relates to a novel process for conducting certain microbiological oxidative transformations of steroids by known strains of microorganisms, or by the enzymes they produce, in the presence of dimethylsulfoxide or derivatives thereof.

While the present invention has application to a wide variety of microbiological transformations, it may be more readily understood by reference to the commercially important 11-hydroxylation of steroids.

The 11-hydroxylation of steroids using various strains of fungi and bacteria is a well-known process which has been commercially used for a number of years. For example, there has been disclosed the use of fungi of the order Mucorales for the 11-hydroxylation of various steroids. In general, some of these fungi introduced an 11α-hydroxyl group and certain others of the order Mucorales, such as *Cunninghamella blakesleeana, bainieri, elegans* and *echinulata*, introduce an 11β-hydroxyl group. Various patents and publications have taught that other families and species of fungi and bacteria also possess the ability to introduce the 11-hydroxyl group, as for example Curvularia, Streptomyces, etc.

In general, the yields obtained by the processes previously set forth have not been quantitative and rarely exceeded 50% of the 11-hydroxylated steroid based on starting material, although in some instances, using certain specific steroids and cultures, the yields have been somewhat greater than this amount.

In accordance with the present invention the surprising discovery has been made that the addition of dimethylsulfoxide to the fermentation medium produces a significant beneficial effect on the 11-hydroxylation process. While not intending to be bound by any theory herein advanced in explanation of possible mechanisms, it is believed that the observed beneficial effect is a manifestation of changes in the nature of transport across cell membranes of either or both the enzyme and steroid, of changes in the activity of the various enzymes present in the system, of changes in the growth capabilities of contaminant microorganisms, and/or of changes in the extraction of the steroidal material from the mycelium. These possibilities are not exhaustive nor are they mutually exclusive, and quite possibly more than one mechanism is involved.

Further typifying the practice of this invention, it has been found that if an amount from about 1% to about 50%, preferably less than 20% and ideally up to about 10%, of dimethylsulfoxide is introduced into a fermentation broth of an oxidative microorganism, such as for example the 11-hydroxylating organisms *Cunninghamella blakesleeana, Curvularia lunata*, or any of the many others known to the art, conversion of the steroid upon incubation for periods from about 4 to about 48 hours is effected with a greater yield of and with a greater total recovery of the 11-hydroxy steroid as well as with a concomitant reduction in the amount of undesired side products. It will be recognized, of course, that the optimum amount of dimethylsulfoxide will vary not only with the particular microorganism employed but also with the particular conditions of incubation, including rate of aeration, broth composition, size and type of fermentation equipment, and the like. Thus, for example, while the optimum amount of dimethylsulfoxide for the 11β-hydroxylation of a preferred steroid, 6α-fluoro-16,17-acetonide compound S, with the microorganism, *Cunninghamella blakesleeana*, A.T.C.C. No. 8688b, is from about 7% to about 10% by volume based on the total initial volume of the fermentation medium, this amount will not necessarily apply to different transformations, different organisms or different steroidal starting materials, e.g. compound S.

It is expected that in the environment of the fermentation medium, the dimethylsulfoxide may be itself converted to other derivatives, and that one or more of these derivatives are responsible for the beneficial effects observed. Among such possibilities are dimethylsulfide, dimethylsulfone, methylsulfenic acid, methylsulfinic acid and/or methylsulfonic acid. Dimethylsulfoxide is, however, quite satisfactory in terms of cost and ease of handling, and such derivatives thereof are considered as merely possible substitutes.

Essentially, any steroid compound containing from 18 to 27 carbon atoms inclusive, which is unsubstituted at C-11, may be used as starting material for this aspect of the process of the present invention. Thus, the starting materials belong especially to the androstane, estrane, pregnane, cholestane and sapogenin series. They may possess a keto or hydroxyl group at C-3 or may be unsubstituted at said position, and may be saturated or unsaturated. Double bonds may be present at C-1, C-4, C-5, C-6, C-16, etc. or combinations of the same. A great variety of substituents may be also present in one or several positions of the steroid molecule, and particularly halogen atoms at C-2, 6, 16 and/or 21; alkyl groups at C-2, 4, 6, 16, 17, etc., alkylidenedioxy groups at C-16α, 17α, etc. Other substituents may be also present at C-1, 2, 4, 6, 7, 12, 14, 15, 16, 17, 18, 19, 20 and 21, e.g. a keto group at C-20.

Suitable starting materials thus include:

testosterone,
19-nor-testosterone,
17α-methyltestosterone,
17α-vinyltestosterone,
17α-ethynyl-19-nor-testosterone,
dihydroallotestosterone,
2-hydroxymethylene-17α-methyldihydroallotestosterone,
$\Delta^5$-androstene-3β,17β-diol,
$\Delta^4$-androstene-3,17-dione,
progesterone,
17α-hydroxyprogesterone,
17α-acetoxyprogesterone,
pregnenolone,
allopregnenolone,
6α-methyl-17α-hydroxyprogesterone,
6α-fluoro-17α-hydroxyprogesterone,
6-chloro-6-dehydro-17α-hydroxyprogesterone,
21-fluoroprogesterone,
3-desoxyprogesterone,
19-nor-progesterone,
desoxycorticosterone,
$\Delta^4$-pregnene-17α,21-diol-3,20-dione (compound "S"),
6α-methyl "S,"
6α-fluoro "S,"
6α-chloro "S,"
16α-methyl "S,"
16β-methyl "S,"
16α-hydroxy "S,"
16α,17α-acetonide of 16α-hydroxy "S,"
6α-fluoro-16α-methyl "S,"

16α,17α-acetonide of 6α-fluoro-16α-hydroxy "S,"
Δ⁵-pregnene-3β,17α,21-triol-20-one,
6,16α-dimethyl "S,"
allopregnane-3β,17α,21-triol-20-one,
allopregnane-17α,21-diol-3,20-dione,
16α-methylallopregnane-17α,21-diol-3,20-dione,
1-dehydro "S,"
6-dehydro "S,"
1-dehydro-16α-methyl "S,"
1,6-bisdehydro "S,"
6-fluoro-16α-methyl-1-dehydro "S,"
estrone,
estradiol,
cholesterol,
cholestenone,
cholanic acids,
diosgenin,
tigogenin, etc.

The microorganisms used in this process include those fungi and bacteria described in the literature as effecting 11α- and 11β-hydroxylation.

The fungi used generally belong to the classes Phycomyceteae, Ascomyceteae, Basidiomyceteae and Fungi Imperfecti.

The Phycomycetes more commonly used for 11-hydroxylation belong to the order Mucorales, family Mucoraceae, especially those species belonging to the genus Absidia or Rhizopus such as for example *Absidia glauca*, *Rhizopus nigricans* and *Rhizopus arrhizus*, or to the family Choanephoraceae, particularly the genus Cunninghamella, especially *Cunninghamella blakesleeana*, *Cunninghamella bainieri*, *Cunninghamella elegans* and *Cunninghamella echinulata*.

The Ascomycetes used for this type of reaction belong to the orders Hypocreales, Sphaeriales and Eurotiales, such as for example *Giberella fujikuroi*, *Neurospora sitophila* and *Eurotium chevalieri*, respectively.

The Basidiomycetes used for 11-hydroxylation belong particularly to the order Agaricales, family Agaricaceae, of the genera Psilocybe, Stropharia and Conobybe, and specifically the species *Panaeolus companulatus* and *Psilocybe caerulescens* var. *Mazatecorum*.

Examples of suitable Fungi Imperfecti used in our process are: *Curvularia lunata*, *Fusarium moniliforme* and other Fusarium species, *Stachylidium bicola*, *Helminthosporium sativum*, *Cephalotecium roseum*, *Pestalotia foedans*, *Dactylium dendroides*, *Aspergillus ochraceus*, *Aspergillus niger* and other Aspergillus species, *Penicillium chrysogenum*, *Penicillium notatum*, *Penicillium nigricans*, *Penicillium roqueforti* and other Penicillium species, *Spondylocladium australe*, *Arthrobotrys superba*, Coniothyrium species, Pycnosporium species, Rhodoseptoria species, *Trichothecium roseum*, *Stachylidium theobromae*, *Strachylidium bicola*, and Epicoccum species.

Other microorganisms belonging to the bacteria (order Actinomycetales) and specially Streptomyces species, such as *Streptomyces fradiae*, may also be used in this process.

The culture media will contain mainly a source of carbon, a source of nitrogen, cofactors and minerals. Examples of carbon sources include carbohydrates such as glucose, maltose, mannose, dextrose, lactose, sucrose, galactose, molasses and the like, polyalcohols such as glycerol, manitol and the like, starches, etc.

Adequate sources of organic nitrogen are vegetable or animal proteins such as soybean meal, corn steep liquor, corn-meal, lactalbumin, caseine, peptones, amino acids or commercial products such as Phytone (enzymatic digest of soya meal), Casitone or Edamine (lactalbumin hydrolyzates) Micophil (soybean protein), Nutrient L-1 (lactalbumin hydrolyzate), N.Z-amine (pancreatic hydrolyzate of caseine), and other similar materials. There may be also used as sources of nitrogen, nitrates or ammonium salts such as sodium or potassium nitrate, ammonium nitrate, ammonium sulfate, ammonium hydroxide solutions urea, etc.

The mineral constituents are present in the form of salts, specially chlorides, phosphates and sulfates of sodium, potassium, iron, manganese, etc.

Yeast extract, vitamins, decoctions of potato, etc. may be mentioned as cofactors.

In general, the liquid culture media used in our process are those used in the known process, and vary in accordance with the oxygenating microorganism.

An antifoaming agent, such as for example silicone, glyceride oils and waxes, soybean oil, castor oil, sulfonated oils, mineral oils, and the like may be added. The pH of the culture media is adjusted at the optimum pH for the growing of each microorganism.

In practicing the process of the present invention, a mycelial growth of the oxygenating microorganism is first obtained through incubation of a culture of the same in the appropriate liquid medium for a period of time of between 6 to 48 hours, preferably for 24 hours. There is then carefully added the desired amount of dimethylsulfoxide, taking care that the temperature of the medium does not exceed about 28° C. To this mixture is then added the steroid used as substrate, either in solid form or dissolved in the minimum amount of a solvent such as ethanol, dioxane, acetone, etc. Alternatively, the steroid to be hydroxylated may be dissolved in a small amount of the total dimethylsulfoxide to be used in the medium. The amount of steroid utilized is essentially the same as heretofore employed, keeping in mind such things as inhibition. Maximization of the amount of steroid can often be realized by adding the steroid at the same rate it is disappearing, i.e., being converted. Once steroid is added, incubation is resumed for a period of time of between 4 to 48 hours, depending on the substrate. The point of optimum conversion may be determined by periodically talking aliquots which may be analyzed by paper chromatography.

When the reaction is complete, the mixture is extracted with several volumes of an organic, water-immiscible solvent such as ether, methylene dichloride, ethyl acetate and the like, using preferably methylene dichloride, and the organic extract is washed several times with water to eliminate the dimethylsulfoxide, re-extracting the combined washings with methylene dichloride to avoid the loss of steroid. The combined extract is dried, evaporated to dryness and purified by the usual methods.

This process may be also effected by using instead of a culture of the microorganism, a solution of the enzymes produced thereby, or with a suspension of spores. While the process of the present invention has been typified above in its application to 11-hydroxylation, the value of dimethylsulfoxide in these applications extends to other microbiological oxidative conversions. Among these may be mentioned the microbiological side chain degradation of sterols such as cholesterol, 19-hydroxy-cholesterol, 3-acetate and the like with microorganisms of the order Schizomycetes, family Actinomycetales, most notably *Nocardia restrictus*, A.T.C.C. No. 14887, and certain species of Mycobacterium including *Mycobacterium flavescens*, *Mycobacterium phlei*, A.T.C.C. No. 10142, *Mycobacterium acapulcensis*, A.T.C.C. No. 15414, and the like.

The following examples serve to typify the nature of this invention, but being presented solely for the purpose of illustration, they are not intended to limit it.

EXAMPLE 1

There was prepared a culture of *Cunninghamella blakesleeana*, A.T.T.C. 8688b, in five 1-liter Erlenmeyer flasks containing 200 cc. each of a culture medium of the following composition:

| | Grams |
|---|---|
| Soybean meal | 5 |
| Yeast extract ("Difco") | 5 |
| $K_2HPO_4$ | 5 |
| NaCl | 5 |
| Cerelose (commercial glucose) | 20 |
| Distilled water to complete | 1 liter. |

The pH of this culture medium was adjusted to 7.2.

After 24 hours of growing at 28–30° C. under aeration and stirring (250 r.p.m.), the content of the flasks was combined and added to a stainless steel fermentor of 14 liters capacity containing 4 liters of the same culture medium and 10 g. of Silicone A as an antifoaming agent. There were then carefully added 500 cc. of dimethylsulfoxide (10% by volume), while maintaining the temperature below 28° C. and 500 mg. of 6α-fluoro-16α,17α-isopropylidenedioxy-Δ⁴-pregnene-21-ol-3,20-dione dissolved in 50 cc. of 95% ethanol, and the incubation was resumed at the same temperature under stirring (273 r.p.m.) and aeration (1 vol./lt./min.) for 12 hours further. At the end of this time the product was extracted three times with methylene chloride and the organic extract was washed several times with water to eliminate the dimethylsulfoxide, re-extracting the washings to avoid loss of steroid. The combined extracts were dried over anhydrous sodium sulfate and evaporated to dryness under reduced pressure. The solid residue was purified by chromatography on silica gel-Celite diatomaceous earth, thus yielding 6α-fluoro-16α,17α-isopropylidenedioxy-Δ⁴-pregnene-11β,21-diol-3,20-dione (acetonide of 6α-fluoro-16α-hydroxy-hydrocortisone) in pure form, identical to an authentic sample, in 78% yield.

EXAMPLE 2

The preceding example was repeated but the dimethylsulfoxide was omitted. In this case there was obtained the acetonide of 6α-fluoro-16α-hydroxy-hydrocortisone in 30% yield.

EXAMPLE 3

In the method of Example 1 the incubation time was reduced to 6 hours to produce the acetonide of 6α-fluoro-16α-hydroxy-hydrocortisone in 68% yield.

EXAMPLE 4

In the method of Example 1 the incubation time was reduced to 8 hours, thus yielding the 11β-hydroxylated compound in 72% yield.

EXAMPLE 5

Example 1 was repeated but 25% by volume of dimethylsulfoxide was added to produce the acetonide of 6α-fluoro-16α-hydroxy-hydrocortisone in 50% yield.

In another experiment there were used equal amounts of the culture medium and dimethylsulfoxide, thus obtaining a 40% yield of the hydroxylated product.

EXAMPLE 6

In the method of Example 1 the incubation time was extended to 12 hours to produce the acetonide of 6α-fluoro-16α-hydroxy-hydrocortisone in 70% yield.

EXAMPLE 7

In accordance with the method described in Example 1 the compounds mentioned below under I were incubated with a culture of *Cunninghamella blakesleeana*, A.T.C.C. 8688b, in the presence of 10% by volume of dimethylsulfoxide to produce the corresponding 11β-hydroxy compounds listed under II.

| I | II |
|---|---|
| Compound "S" | Hydrocortisone. |
| Acetonide of 16α-hydroxy-"S" | Acetonide of 16α-hydroxyhydrocortisone. |
| 6α-fluoro-Δ⁴-pregnene-17α,21-diol-3,20-dione. | 6α-fluorohydrocortisone. |
| 6α-chloro-Δ⁴-pregnene-17α,21-diol-3,20-dione. | 6α-chlorohydrocortisone. |
| 6α-methyl-Δ⁴-pregnene-17α,21-diol-3,20-dione. | 6α-methylhydrocortisone. |
| 16α-methyl-Δ⁴-pregnene-17α,21-diol-3,20-dione. | 16α-methylhydrocortisone. |
| 16β-methyl-Δ⁴-pregnene-17α,21-diol-3,20-dione. | 16β-methylhydrocortisone. |
| 6α-fluoro-16α-methyl-Δ⁴-pregnene-17α,21-diol-3,20-dione. | 6α-fluoro-16α-methylhydrocortisone. |
| 6α-fluoro-16β-methyl-Δ⁴-pregnene-17α,21-diol-3,20-dione. | 6α-fluoro-16β-methylhydrocortisone. |
| Progesterone | 11β-hydroxyprogesterone. |
| 17α-hydroxyprogesterone | 11β,17α-dihydroxyprogesterone. |
| 6α-methyl-17α-acetoxyprogesterone | 6α-methyl-11β-hydroxy-17α-acetoxyprogesterone. |
| 6-chloro-Δ⁴,⁶-pregnadien-17α-ol-3,20-dione acetate. | 6-chloro-Δ⁴,⁶-pregnadiene-11β,17α-diol-3,20-dione 17-acetate. |
| Δ¹,⁴-pregnadiene-17α,21-diol-3,20-dione. | Δ¹,⁴-pregnadiene-11β,17α,21-triol-3,20-dione. |
| 6α-fluoro-Δ¹,⁴-pregnadiene-17α,21-diol-3,20-dione. | 6α-fluoro-Δ¹,⁴-pregnadiene-11β,17α,21-triol-3,20-dione. |
| 6α-fluoro-16α-methyl-Δ¹,⁴-pregnadiene-17α,21-diol-3,20-dione. | 6α-fluoro-16α-methyl-Δ¹,⁴-pregnadiene-11β,17α,21-triol-3,20-dione. |
| 6α-fluoro-16α-methyl-Δ¹,⁴-pregnadiene-17α,21-diol-3,20-dione. | 6α-fluoro-16β-methyl-Δ¹,⁴-pregnadiene-11β,17α,21-triol-3,20-dione. |
| Testosterone | 11β-hydroxytestosterone. |
| 17α-methyltestosterone | 17α-methyl-11β-hydroxytestosterone. |
| 17α-ethynyl-19-nor-testosterone | 17α-ethynyl-11β-hydroxy-19-nor-testosterone. |
| Estrone | 11β-hydroxyestrone. |
| Cholestenone | 11β-hydroxycholestenone. |
| Diosgenin | 11β-hydroxydiosgenin. |
| Tigogenin | 11β-hydroxytigogenin. |

EXAMPLE 8

By subjecting 6α-fluoro-16α,17α-isopropylidenedioxy-Δ⁴-pregnen-21-ol-3,20-dione to 11β-hydroxylation with *Cunninghamella bainieri*, *Cunninghamella elegans*, or *Cunninghamella echinulata* according to the known procedures and conditons appropriate for the respective microorganisms, but introducing 10% by volume of dimethylsulfoxide in accordance with the procedure of Example 1, there is obtained in each instance, 6α-fluoro-16α,17α-isopropylidenedioxy-Δ⁴-pregnene-11β,21-diol-3,20-dione in yields comparable to that described in Example 1.

EXAMPLE 9

6α-fluoro-16α,17α-isopropylidenedioxy-Δ⁴-pregnen-21-ol-3,20-dione is subjected to 11β-hydroxylation by incubation with a culture of *Cunninghamella blakesleeana* in accordance with the procedure of Example 1 utilizing, however, 250 cc. of dimethylsulfoxide (5% by volume). Upon completion of the procedure as therein described, 6α-fluoro-16α,17α-isopropylidenedioxy-Δ⁴-pregnene-11β,21-diol-3,20-dione is obtained in approximately 70% yield.

EXAMPLE 10

A culture of *Rhizopus nigricans*, A.T.C.C. 6227b, was prepared by inoculating an aqueous medium which contained 2% of peptone and 5% of corn syrup with a vegetating growth of the above culture in the same medium and stirring at 28° C. with aeration for 24 hours.

To 340 cc. of this culture there were then slowly added 30 cc. of dimethylsulfoxide while maintaining the temperature around 28° C., and 100 mg. of progesterone dissolved in 4 cc. of dimethylsulfoxide, and the mixture was stirred with aeration at 28° C. for 24 hours further. The product of this incubation was extracted several times with methylene chloride, the extract was washed with water, dried over anhydrous sodium sulfate and concentrated to a small volume under reduced pressure.

The concentrated extracts were adsorbed on a column prepared with 20 g. of silica gel and 20 g. of Celite diatomaceous earth washed previously with methylene chloride. Elution with a mixture of methylene chloride: acetone 80:20 and crystallization gave 11α-hydroxy progesterone in 75% yield.

EXAMPLE 11

A strain of *Curvularia lunata*, A.T.C.C. 13935, was grown in a Sabouraud glucose-agar medium (Difco). The growth obtained after incubating for a week at 25° C. was suspended in 5 cc. of sterile water. This suspension was divided in five portions of 1 cc. each, which were employed for inoculating five Erlenmeyer flasks of 250 cc. capacity containing 50 cc. each of a culture medium of the following composition:

| | |
|---|---|
| Glucose | grams 20 |
| $(NH_4)_2HPO_4$ | do 5 |
| $NaNO_3$ | do 3 |
| $K_2HPO_4$ | do 1 |
| $MgSO_4 \cdot 7H_2O$ | do 0.2 |
| KCl | do 0.5 |
| $ZnSO_4$ | Trace |
| $FeSO_4 \cdot 7H_2O$ | Trace |

Distilled water to comple 1 liter.

The cultures were incubated under rotatory stirring for 72 hours at 25° C. The growth was homogenized for 1 minute in a Waring Blendor, and 2 cc. portions of the suspension thus obtained were employed for inoculating 100 Erlenmeyer flasks containing the same amount of the medium described above. The mixtures were incubated for 24 hours under rotatory stirring at 25° C. and 280 r.p.m. To each flask there were added 5 cc. of dimethylsulfoxide and 50 mg. of compound "S" dissolved in 2 cc. of 95% ethanol, and the incubation was continued under the same conditions for 24 hours. The contents of the flasks were combined and extracted with four portions of methylene chloride. The combined extract was washed well with water to eliminate the dimethylsulfoxide, dried over anhydrous sodium sulfate and concentrated at low temperature to a volume of 25 cc. This solution was adsorbed on 4 g. of silica gel and eluted with methylene chloride:ether (9:1) to produce hydrocortisone in 75% yield.

EXAMPLE 12

A culture of *Psilocybe caerulescens* var. *Mazatecorum*, (Heim), A.T.C.C. 13964, was maintained by serial transference every two weeks, in a mycophyl-agar or malt-agar medium, incubating at a temperature of 25–28° C.

The growth obtained in an inclined agar tube was suspended in 10 cc. of sterile water, and 2 cc. of this suspension were used to inoculate an Erlenmeyer flask containing 200 cc. of the following culture medium:

| | |
|---|---|
| Phytone | grams 2 |
| Dextrose | do 2 |
| Water to | cc 200 |

The cultures were incubated under rotatory stirring (200 r.p.m.) at 25–28° C. for three days. The mycelium thus obtained was dispersed using a blender, and 20 cc. of the microbial suspension thus obtained was inoculated to each of ten 1-liter Erlenmeyer flasks containing 200 cc. each of the same culture medium and then incubated for 24 hours further. To each flask there were then slowly added 10 cc. of dimethylsulfoxide.

To each flask there was added 50 mg. of the 3,21-diacetate of $\Delta^5$-pregnene-3β,17α,21-triol-20-one, and the stirring under aeration was continued for 48 hours further at the same temperature. The content of the flasks was combined and extracted several times with methylene chloride, the extract was washed with water, dried over anhydrous sodium sulfate and evaporated to dryness under reduced pressure. The residue was adsorbed in a column charged with 12 g. of silica gel and 12 g. of Celite diatomaceous earth, thus obtaining $\Delta^4$-pregnene-11α,17α,21-triol-3,20-dione, M.P. 217–219° C. identical with an authentic sample of 11-epi "F."

EXAMPLE 13

The vegetative growth of *Giberella fujikuroi* (*Fusarium moniliforme*), A.T.C.C. 11161, obtained after one week's incubation at 25° C. in an inclined test tube containing a potato dextrose-agar medium, was suspended in 10 cc. of sterile water. One cc. of this suspension was then used to inoculate ten 1-liter Erlenmeyer flasks, each containing 200 cc. of Czapek's solution supplemented with 0.05% of yeast extract. The flasks were stirred in the presence of air under submerged conditions (rotatory shakers operated at 150 r.p.m.) for 18 to 21 hours to obtain an abundant growth of the microorganism. To each flask there was then added 15 cc. of dimethylsulfoxide, maintaining the temperature at 25–28° C., and 50 mg. of 6α-fluoro-16α,-17α-isopropylidenedioxy-$\Delta^4$-pregnen-21-ol-3,20-dione, and the incubation was resumed for 18 hours further under the same conditions. Following this incubation period, the contents of the flasks were combined and then extracted several times with methylene chloride, and the extract was washed well with water, dried over anhydrous sodium sulfate and evaporated to dryness under reduced pressure. The residue was dissolved in methylene chloride, adsorbed in a column charged with 15 g. of silica gel and 15 g. of Celite diatomaceous earth. The fractions eluted from the column with ether and ether:acetone (90:10) were found to contain 400 mg. of 6α-fluoro-16α,-17α-isopropylidenedioxy-$\Delta^4$-pregnene-11α,21-diol-3,20-dione identical to an authentic sample.

What is claimed is:

1. In the process for producing 11-hydroxylated steroids by incubating the corresponding 11-desoxy steroid with a microorganism capable of effecting said hydroxylation or with the enzymes produced thereby, the improvement comprising conducting said incubation in the presence of dimethylsulfoxide.

2. A process of claim 1 wherein the steroid is a member of the androstane, pregnane, estrane, cholestane or sapogenin series, and the incubation is in a liquid medium for a period of from 4 to 48 hours.

3. A process of claim 1 wherein the amount of dimethylsulfoxide used is from about 1% to about 50% of the total volume of the culture medium.

4. A process of claim 3 wherein the amount of dimethylsulfoxide used is up to about 10% of the total volume of the culture medium.

5. A process in accordance with claim 4 wherein the oxygenating microorganism belongs to the genus Cunninghamella and the steroid is of the pregnane series.

6. A process in accordance with claim 4 wherein the oxygenating microorganism belongs to the genus Rhizopus and the steroid is of the pregnane series.

7. A process in accordance with claim 4 wherein the oxygenating microorganism is *Curvularia lunata* and the steroid is of the pregnane series.

8. A process of claim 5 wherein the oxygenating microorganism is *Cunninghamella blakesleeana*.

9. A process of claim 5 wherein the oxygenating microorganism is *Cunninghamella bainieri*.

10. The process of claim 4 wherein the oxygenating microorganism is *Fusarium moniliforme* and the steroid is of the pregnane series.

11. A process for producing 6α-fluoro-16α,17α-isopropyl-idenedioxy-$\Delta^4$-pregnene-11β,21-diol-3,20-dione, which comprises incubating 6α-fluoro-16α,17α-isopropylidenedioxy-$\Delta^4$-pregnene-21-ol-3,20-dione with a culture of *Cunninghamella blakesleeana*, A.T.C.C. 8688b, in a liquid culture medium containing dimethylsulfoxide.

12. The process of claim 11 wherein the liquid culture medium contains up to about 10% of dimethylsulfoxide.

References Cited

UNITED STATES PATENTS

| | | | |
|---|---|---|---|
| 3,054,725 | 9/1962 | Ilavsky et al. | 195—51 |
| 3,060,100 | 10/1962 | Wettstein et al. | 195—51 |

ALVIN E. TANENHOLTZ, *Primary Examiner.*